March 15, 1932.     E. GROSS     1,849,830
PROTECTIVE ARRANGEMENT
Filed Aug. 9, 1930
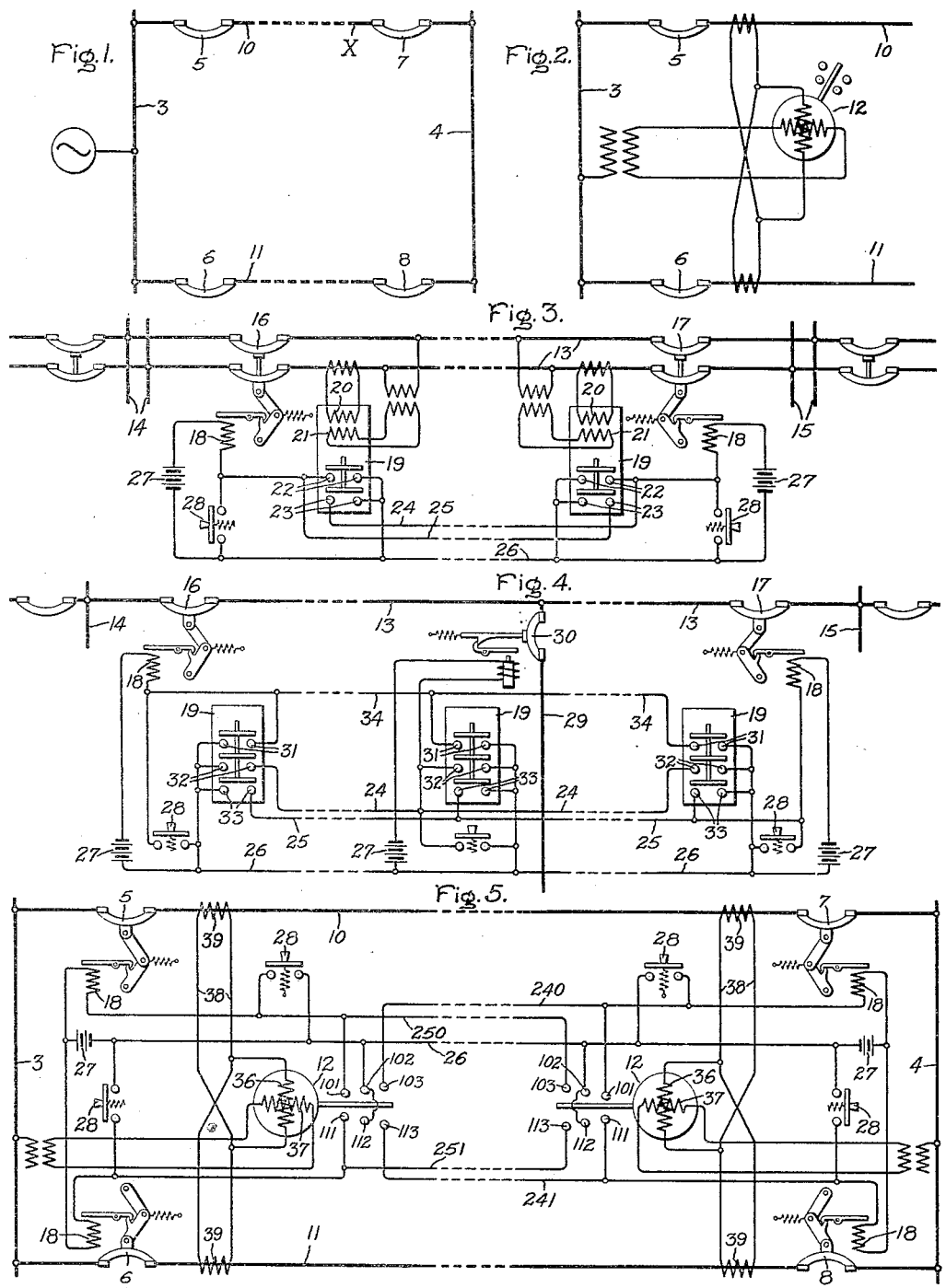
Inventor:
Erich Gross,
by Charles E. Mullan
His Attorney.

Patented Mar. 15, 1932

1,849,830

UNITED STATES PATENT OFFICE

ERICH GROSS, OF VIENNA, AUSTRIA, ASSIGNOR TO GENERAL ELECTRIC COMPANY, A CORPORATION OF NEW YORK

PROTECTIVE ARRANGEMENT

Application filed August 9, 1930, Serial No. 474,274, and in Germany August 23, 1929.

My invention relates to improvements in protective arrangements for electric systems and more particularly to improvements in protective arrangements wherein fault responsive protective means are located at a plurality of more or less widely separated points of an electric system for selectively isolating the section of the system included within said points on the occurrence of a fault on said section. An object of my invention is to provide an improved protective arrangement whereby more rapidly to effect a complete isolation of a faulty section of an electric system in response to the functioning of the protective means which operates first.

The problem of selective protection does not consist merely in isolating a faulty point in an electric system so that only the section between the fault and the switches limiting the section are deenergized but the circuit opening operation or isolation of the section must be accomplished in the shortest possible time. When selective protection is to be obtained, for example by means of distance relays, usually the farther the relay is from the point of fault, the greater the time taken by the relay to operate. If there be assumed a section of an electric system and a fault thereon in the immediate vicinity of a station, then the relay at this station will come into operation with a time delay which is practically nothing owing to the short distance at which the fault has occurred. The relay in the other station has, however, a fault responsive distance extending over the length of the whole section and, therefore, operates with a greater time delay. Consequently the system disturbance lasts until this second relay also operates.

This disadvantage is eliminated, in accordance with my invention, wherein each relay acts upon all the switches limiting the section so that all the switches in the section are released by the relay which operates first. In any case, the release connection can be effected through the available means for remote control. Thus, there may be used any available auxiliary wiring or wiring put in for the purpose and connecting the various stations together or the connection may be obtained by high frequency transmission or carrier current without the necessity of separate auxiliary wires. Further, in accordance with my invention, the arrangement is so designed that the switches limiting the section are released when only one relay is operated while, for example, if the switch at one station is opened by hand, the switches in the other stations belonging to this section are not open.

My invention, however, is not limited to protective arrangements wherein the releasing times are dependent on the distances between the relay locations and the fault but is much more generally applicable for obtaining shorter releasing times where the operating time of the relays depends on other features. It is possible that the releasing time may have a different relation from that dependent on the distance that is impedance, reactance or resistance principle. Thus, the releasing time may be influenced by current and voltage or it may depend only on the current or only on the voltage. Also, it is possible to utilize my invention if the actuation of the relay is accomplished by current and voltage or only by current or only by voltage while the releasing time, itself, is determined in some other manner, for example is constant.

My invention will be better understood from the following description when considered in connection with the accompanying drawings and its scope will be pointed out in the appended claims.

In the accompanying drawings, Figs. 1 and 2 are elementary circuit diagrams explanatory of my invention. Fig. 3 represents diagrammatically an embodiment of my invention as applied to the protection of a section of an electric circuit. Fig. 4 represents a modification of my invention applied to a section of an electric circuit including a branched feeder. Fig. 5 represents an embodiment of my invention as applied to the protection of parallel feeders.

For explanation of another application of my invention, I make use of the protection of parallel lines by differential relays. In this case there may be used relays which respond with a practically constant time delay of some given value when a differential current occurs in a certain direction. The switches, are then, in accordance with my invention, actuated at both ends of the faulty section to isolate the same by the relay operating first. Fig. 1 shows a combination of parallel lines or feeders 10, 11 connected to station buses 3, 4 through circuit breakers 5, 6 and 7, 8 respectively. If it be assumed that power is fed only from station bus 3 and that a short circuit occurs, for example at X on feeder 10 close to station bus 4, then substantially the same short circuit current will appear in each of the two parallel lines 10 and 11. Consequently, the difference between the currents in the feeders 10 and 11 adjacent the station bus 3 is at first very small or may even be zero and is, therefore, insufficient for the actuation of the differential relay at the station 3. At station 4, however, current flows over the feeder 11 to the station bus 4 and in the reverse direction over feeder 10 to the fault X. There is thus a relative reversal of the current in the feeder 10 and the difference between the currents in the feeders 10 and 11 adjacent station 4 becomes in effect their arithmetical sum. Consequently, a differential relay at station 4, which may be connected as is the relay 12 in the well known manner shown in Fig. 2, will operate and effect the opening of the circuit breaker 7. After the opening of this circuit breaker the flow of current in the two lines is different. The entire fault current now flows only over feeder 10 so that instead of the difference between the currents in the feeders 10, 11 being zero or very small as when circuit breaker 7 was closed, the difference is relatively large and the differential relay 12, such as shown in Fig. 2 and installed at station 3, will operate to effect the release of the circuit breaker 5. The opening of the circuit breakers 7 and 5 thereby isolates the faulty feeder 10.

If $T_3$ and $T_4$ are the operating times of the differential relays in stations 3 and 4 respectively, it will be obvious that the total duration of the disturbance amounts to $$T_1 = T_3 + T_4 + t,$$

where $t$ is the sum of the inherent operating times of the circuit breakers in the two stations. However, if in accordance with my invention the two circuit breakers of a feeder are in some way coupled together, these two circuit breakers will be actuated after a time $T_4$ by the releasing impulse so that the total duration of the disturbance $$T_2 = T_4 + t_1 + t_2,$$

where $t_1$ is the time necessary for transmitting the releasing impulse from station 4 to station 3 and $t_2$ the inherent operating time of the circuit breaker at station 3. It is easily possible to keep $t_1$ so small that $t_1 < \frac{1}{2} t$ and then $T_2 = \frac{1}{2} T_1$. In any case $T'_2 < T_1$. The desired condition is, therefore, met.

As previously mentioned, the invention is not limited to relays which are, as in the examples used for explanation in Fig. 1 excited by a current or used for the protection of parallel lines. It is also advantageous to provide the protective connections with the necessary additional devices according to my invention, for example in the case of only one line section or for more than two parallel lines. The connection can be used wherever a line section has automatic switches at the ends. It is not necessary that the section consist of a single line but it may also have more than two parts, for example, where a feeder branches off from an intermediate point of the section as illustrated in Fig. 4. In this case all circuit breakers can be tripped simultaneously in case of a fault by the protective relay means which operates first.

In the embodiment of my invention shown in Fig. 3 there is illustrated a section of an electric circuit 13 which is arranged to be connected to station buses 14, 15 by circuit breakers 16 and 17 respectively. These are shown as latch closed circuit breakers provided with trip coils 18 for controlling these circuit breakers in response to abnormal circuit conditions. There is provided at each station fault responsive relay means 19 which is arranged to control the tripping of the circuit breaker at the station and also, in accordance with my invention, the tripping of the circuit breaker at the other end or station of the section. The relay means 19 may be of any suitable type, the arrangement shown being intended merely as a schematic example of a distance relay which has current and potential windings 20 and 21 respectively connected to be energized in accordance with the current and the voltage of the circuit 13.

In order that the tripping of the circuit breakers 16 and 17 may be effected in the shortest possible time on the occurrence of a fault anywhere within the section 13, the protective relay 19 adjacent each circuit breaker is provided with contact controlling means which operate independently of the contact controlling means of the other relay to effect the opening of both of the circuit breakers 16 and 17. As shown, the contact controlling means comprises a double set of contacts 22, 23 for each relay 19. In order to transfer the tripping impulse of the relay at one end of the section to the circuit breaker at the far end of the section, any suitable current conducting means may be employed, such for example as the auxiliary conductors 24, 25, 26. At each station there may be provided a source of current such as a battery 27 for energizing the trip coil of the circuit breaker at the station and also a manually operated tripping switch 28, as shown.

Assuming that a fault occurs on the section 13, then both of the relays 19 will start their timing operation. The relay that operates first will close its contacts 22 and 23. Assuming that this relay is the one on the right adjacent circuit breaker 17, then the circuit of the trip coil of circuit breaker 18 will be completed through the relay contacts 22 thus energizing the trip coil of circuit breaker 17 from its associated source of current 27. The circuit of the trip coil 18 of circuit breaker 16 will be completed to energize it from its associated source 27 through the auxiliary conductor 25, the contacts 23 of the relay 19 adjacent the circuit breaker 17 and the auxiliary conductor 26. Thus, the tripping of both of the circuit breakers 16 and 17 is effected in response to the more quickly operating of the relays 19. The operation in case the relay 19 on the left operates first will be obvious, the only difference being that the circuit of the trip coil 18 of circuit breaker 17 is completed through the auxiliary conductors 24 and 26. With the arrangement shown, it will be noted that the manually operated tripping switch 28 at either station can be operated under normal circuit conditions to trip the circuit breaker at the station without having any effect on the circuit breaker at the other station.

In the embodiment of my invention shown in Fig. 4, the circuit section 13 is shown in single-line diagram for clearness and as having a branch feeder 29 which is arranged to be connected to the circuit 13 by a latch closed circuit breaker 30. In Fig. 4 the protective relays 19 are indicated schematically merely by their contacts which, as shown, include three pairs, 31, 32, and 33, for each relay, inasmuch as the connections of the windings of the relays form no particular part of my present invention. The connecting means for transmitting the impulses from any one of the relays 19 to the distant circuit breakers includes, as shown, the auxiliary conductors 26, 25, 24 and 34.

Assuming now that a fault occurs, such that operation of the relays 19 is started, then the relay which operates first will, in accordance with my invention, effect the tripping of all the circuit breakers 16, 17, and 30. For example, suppose that the fault is on the branch circuit 29 so that the relay 19 associated with circuit breaker 30 operates. In this case, the circuit of the trip coil 18 of circuit breaker 30 will be completed to energize the trip coil from its associated source 27 through the contacts 32 of the relay 19 associated with the branch circuit. Similarly, the circuit of the trip coil 18 of the circuit breaker 16 will be energized from its associated source through the contacts 31 of the relay 19 associated with the branch circuit 29 and the auxiliary conductors 34 and 26. Also the circuit of the trip coil 18 of the circuit breaker 17 will be completed through its associated source 27, the auxiliary conductors 26 and 25 and the contacts 33 of the relay 19 associated with the branch circuit 29. The tripping circuits established in case some one of the other relays 19 operates first may be traced in a similar manner and will be obvious from the drawings. As is the case with the arrangement shown in Fig. 3 any one of the circuit breakers may be tripped manually under normal conditions without in any way effecting the other circuit breakers.

The embodiment of my invention shown in Fig. 5 includes two parallel feeders 10 and 11 connecting the station buses 3 and 4. At each station there may be provided a protective relay means 12 whose operation is dependent on the difference between the currents in the feeders. As shown, the relay means 12 is of the directional type and includes a current winding 36 and a potential winding 37. The current winding 36 is connected to be energized from an auxiliary circuit 38 including current transformers 39 so as to be energized in accordance with the difference between the currents in the parallel feeders 10 and 11. Examples of protective relays of this type are known to the art.

In accordance with my invention, the relays 12 are provided with a plurality of double-throw contacts 101, 102, 103, 111, 112, and 113 which, as shown, are suitably connected by auxiliary conductors 26, 250, 240, 251, and 241 so arranged as to effect, upon operation of the relay 12 at either station, the tripping of both of the circuit breakers in the feeder at fault by the differential relay which operates first.

Assuming for example, as in Fig. 1, that power is fed from station 3 out on feeders 10 and 11 to station 4 and that a fault occurs on feeder 10 adjacent station 4, then the differential relay 12 at station 4 will operate first and in so operating will complete the circuit of the trip coil 18 of the circuit breaker 7 through its contacts 101 and 102. At the same time, it will complete the circuit of the trip coil 18 of the circuit breaker 5 at station 3 through its contacts 102 and 103, and auxiliary conductors 26 and 250. As before, each of the circuit breakers may be provided with a manually operated tripping switch 28 and with the arrangement shown in Fig. 5 any one of the circuit breakers can be manually tripped independently of the others without interfering therewith. In case a fault occurs on feeder 11 the differential relay 12 which operates first will close its contacts 111, 112, and 113 and thereby effect the opening of both of the circuit breakers 6 and 8 in this feeder. Thus, no matter which of the relays operates first, a practically simultaneous release of the holding means of the circuit breakers in the faulty feeder is effected to eliminate the faulty portion of the system in the time of operation of the relay which operates first.

While I have shown and described my invention in considerable detail, I do not desire to be limited to the exact arrangements shown but seek to cover in the appended claims all those modifications that fall within the true spirit and scope of my invention.

What I claim as new and desire to secure by Letters Patent of the United States is:

1. In combination with a section of an electric system, means for isolating said section on the occurrence of a fault thereon including a circuit breaker at each end of the section and fault responsive means including a protective relay adjacent each circuit breaker each of said relays having contact controlling means operating independently of the contact controlling means of the other relay to effect the opening of both of said circuit breakers on the occurrence of a fault within the section whereby to effect the isolation of the section in response to the relay which operates first.

2. In combination with an electric system, circuit interrupting means at each of a plurality of points of the system, means for holding said circuit interrupting means in the circuit closing position and fault responsive relay means adjacent each of a plurality of said circuit interrupting means, each of said relay means having contact controlling means operating independently of the circuit controlling means of the other relay means to effect the substantially simultaneous release of the holding means of all the circuit interrupting means.

3. In combination with an electric system, circuit interrupting means at each of a plurality of points of the system, relay means at each of a plurality of said points operative on the occurrence of a fault on the system in a time dependent on the distance from the fault to the relay means and means for effecting the opening of all of said circuit interrupting means by the relay means nearest the fault.

4. In combination with an electric system, circuit interrupting means at each of a plurality of points of the system, relay means at each of a plurality of said points operative on the occurrence of a fault on the system and means controlled by said relay means for effecting the opening of all of said circuit interrupting means by the relay means which operates first independently of the other relay means.

5. In combination with an electric system, circuit interrupting means at each of two points of the system and means operative in response to abnormal circuit conditions of the system for controlling said interrupting means including relay means adjacent each of said points, each of said relay means having contact controlling means operating independently of the contact controlling means of the other to effect a circuit controlling operation of both of said circuit interrupting means.

6. In combination with an electric system, circuit interrupting means at each of a plurality of points of the system and means operative in response to abnormal circuit conditions of the system for controlling said interrupting means including relay means adjacent a plurality of said points each of said relay means having contact controlling means operating independently of the contact controlling means of the other relay means to effect a circuit controlling operation of all of said circuit interrupting means.

In witness whereof, I have hereunto set my hand this 14th day of July, 1930.

ERICH GROSS.